United States Patent

[11] 3,628,938

[72] Inventor  Mikhail Ivanovich Kozmin
               ul. Shmidta, 31, kv.6, Konstantinovka
               Donetskoi oblasti, U.S.S.R.
[21] Appl. No. 782,331
[22] Filed     Dec. 9, 1968
[45] Patented  Dec. 21, 1971

[54] DEVICE FOR MANUFACTURING PIPES FROM GLASS METAL
     5 Claims, 3 Drawing Figs.
[52] U.S. Cl. ........................................ 65/207,
     65/221, 65/302, 65/304, 65/324, 65/360, 65/361,
     65/35, 65/68, 65/358, 65/317, 264/71, 25/36
[51] Int. Cl. ...................................... C03b 5/30,
                                                 C03b 5/00
[50] Field of Search ........................... 65/317,
     362, 68, 35, 358, 89, 360, 207, 221, 302, 304, 361;
     25/41 J, 36; 264/71, 72

[56]                References Cited
              UNITED STATES PATENTS
| 384,295   | 6/1888  | Stockwell .......... | 264/71 |
| 1,017,876 | 2/1912  | Landis ............. | 25/41.5 A |
| 1,374,392 | 4/1921  | Roosa .............. | 65/36 |
| 1,527,729 | 2/1925  | Dunajeff ........... | 65/71 X |
| 1,607,475 | 11/1926 | Otto ............... | 65/302 X |
| 2,320,341 | 6/1943  | Bowes .............. | 65/35 X |
| 2,772,517 | 12/1956 | Bowes .............. | 65/35 X |
| 3,106,005 | 10/1963 | McGrew ............. | 25/41.51 X |
| 3,181,222 | 5/1965  | Palmer ............. | 25/41.51 X |
| 3,276,091 | 10/1966 | Pausch ............. | 25/36 |
| 3,362,854 | 1/1968  | Tanabe ............. | 65/35 X |
| 305,716   | 9/1884  | Schulze-Berge ...... | 65/169 |
| 438,807   | 10/1890 | Guptill ............ | 65/360 X |
| 261,961   | 8/1882  | Shickle ............ | 65/360 X |

*Primary Examiner*—Frank W. Miga
*Attorney*—Waters, Roditi, Schwartz and Nissen

ABSTRACT: A device for manufacturing pipes from glass metal comprises, a vertically extending mold which is laterally split into three portions and is supported for vertical reciprocation. The device includes an assembly for laterally displacing the mold portions into operative engagement with one another, and out of engagement with one another. A tipping ladle feeder is fixed to one of the portions of the mold and is vertically displaceable together with that one portion of the mold.

DEVICE FOR MANUFACTURING PIPES FROM GLASS METAL

The present invention relates to devices for manufacturing pipes from softened glass metal and, more particularly, to such devices in which pipes are manufactured by way of pouring glass metal from a ladle feeder into a vertical split mould having a core.

Known in the prior art are devices wherein the mould consists of two vertical split portions, and metal is poured from above by means of a ladle feeder positioned at one and the same constant level.

Such devices are disadvantageous in that they do not make it possible to manufacture pipes more than 1 m. long since, in the course of pouring, presoftened glass metal solidifies before it reaches the mould bottom and, by creating corks, prevents the mould from being filled to the extent of its entire depth.

It is an object of the present invention to eliminate the above disadvantage of the known devices.

The invention has for its specific object to prevent the formation of corks inside the mould while it is being filled with metal.

In the accomplishment of the above and other objects, in the device for manufacturing pipes from glass metal poured into a vertical laterally split mould by means of a ladle feeder the portions of the mould are mounted in such a manner that they are capable of vertically reciprocating relative to one another, and the ladle feeder is motionless relative to one of the portions of the mould which, in the course of its relative displacement, is positioned below. It is most expedient to install the ladle feeder in such a manner that it is capable of vertically reciprocating and is rigidly connected with one of the portions of the mould, also capable of vertical reciprocation and, in the course of displacement, is below the other portions of the mould.

In order to synchronize the gradual tipping of the ladle feeder in the process of filling of the mould, as well as the ladle feeder return to its initial position, with the vertical reciprocation, it is expedient to perform the tipping of the ladle feeder by means of a worm and wheel assembly in which the wheel is rigidly mounted on the tipping axle of the ladle feeder, and the shaft of the worm has a gear seated thereon and engaging a fixed vertical tooth rack.

The following detailed description of a specific embodiment of the invention is given with reference to the accompanying drawings, in which.

Figure 2:
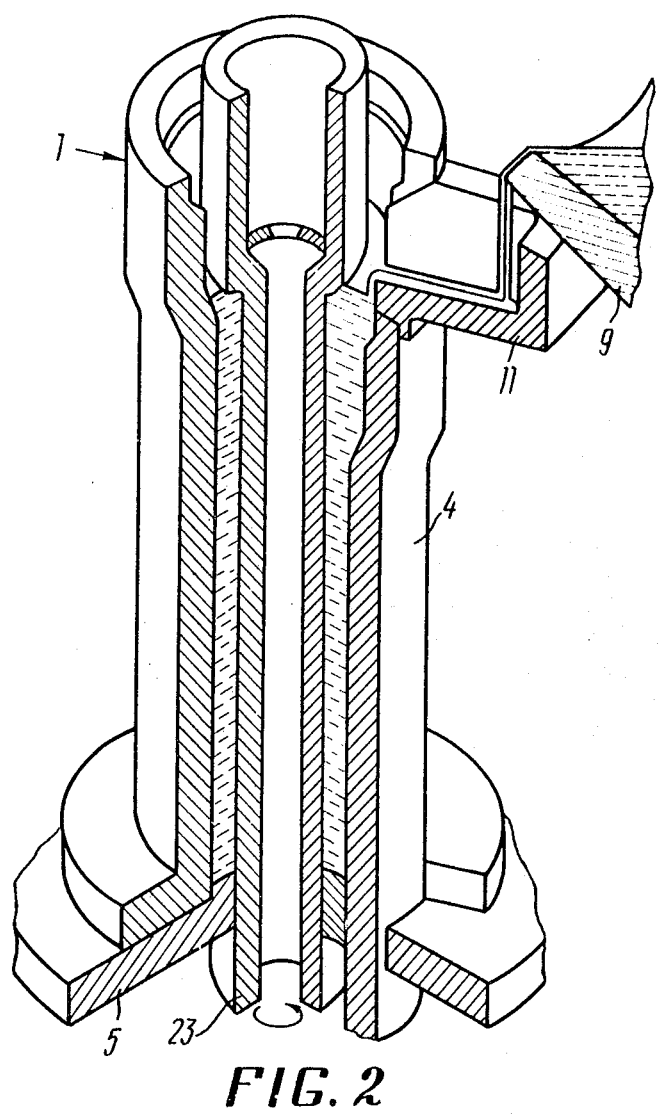
FIG. 2 is a vertical cross section in perspective of the device mould proper.
Figure 3:
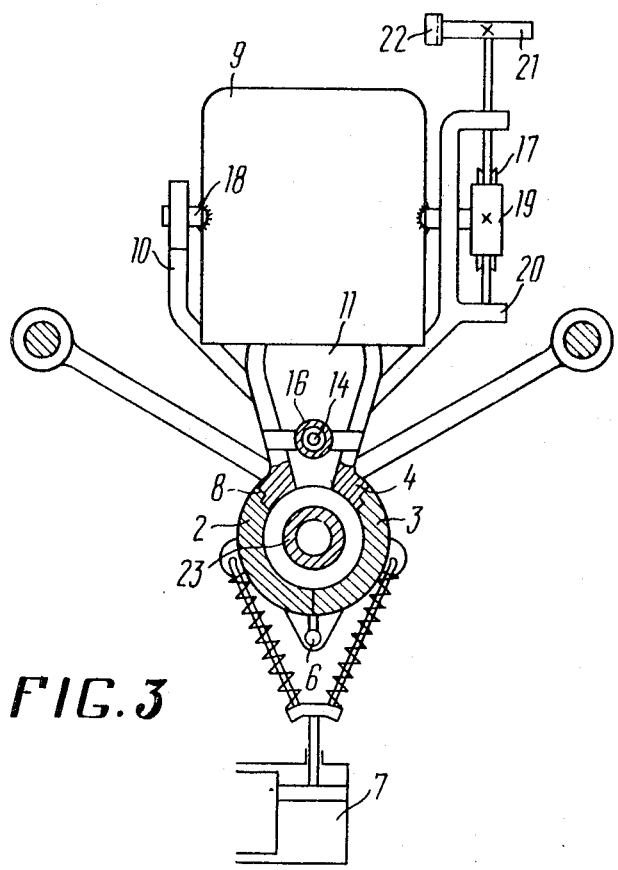
FIG. 3 is a sectional view taken along section III—III of FIG. 1.

The device comprises a vertical cylindrical split mould 1 (FIGS. 1, 2 and 3) consisting of three split portions 2, 3 and 4 (FIG. 3), of which portions 2 and 3 (FIGS. 1 and 2) are mounted on a baseplate 5 on vertical hinges 6 (FIG. 1) in such a manner that they can turn thereon by means of a pneumatic cylinder 7.

The split portion 4 is linked with the portions 2 and 3 of the mould 1 by means of vertical shaped slots 8 (FIG. 3) in such a manner that it is capable of displacing therein.

By means of a lug 10, a ladle feeder 9 (FIGS. 1, 2 and 3) is rigidly connected with the portion 4 of the mould through a chute 11.

The ladle feeder 9 is vertically reciprocated by means of a mechanism 12 (FIG. 1) which is actuated by an electric motor 13 transmitting rotation to a screw 14 with a nut 15 hingedly connected with the chute 11 by means of a tube 16.

A ladle feeder tipping and return to its initial position are synchronized with its vertical reciprocation by means of a worm drive whose wheel 17 (FIGS. 1 and 3) is rigidly secured on an axle 18 of the ladle feeder 9 and worm 19 is mounted in brackets 20 of the lug 10. Mounted on the worm shaft is a gear 21 engaging a fixed vertical tooth rack 22. A core 23 (FIGS. 1 and 2) of the mould 1 is mounted on a transverse member 24 with capability of rotation, the transverse member being connected to a lifting and lowering mechanism 25 (which is not described in detail as it does not constitute the subject of the invention).

The core 23 is rotated by a drive 26.

Prior to its operation, the ladle feeder 9 and, together with it, the portion 4 of the mould 1 (FIG. 1) assume their extreme lower position (shown by dotted lines), whereas the portions 2 and 3 are opened.

Then, turning on the hinges 6, the portions 2 and 3 are brought together by means of the pneumatic cylinder 7, and are engaged with the upper end of the split portion 4 of the mould.

By means of the mechanism 25 the core 23 is brought inside the mould 1, whereupon it is connected to the rotatable drive 26 by means of a coupling 27. Then, the electric motor 13 of the mechanism 12 is switched on to start the rotation of the screw 14, which makes the nut 15 rise and pull therewith the ladle feeder 9 and the portion 4 of the mould.

While moving upwards, the ladle feeder 9 rolls on the rack 22, as a result of which the gear starts rotating the worm 19 and hence the worm wheel 17. The latter being rigidly secured on the axle 18, the ladle feeder 9 starts tipping gradually towards the chute 11, which results in gradual filling-up of the mould 7 with glass metal.

The rotation of the core in the course of pouring glass metal attributes to a better quality of the inner surface of a pipe.

Figure 1:
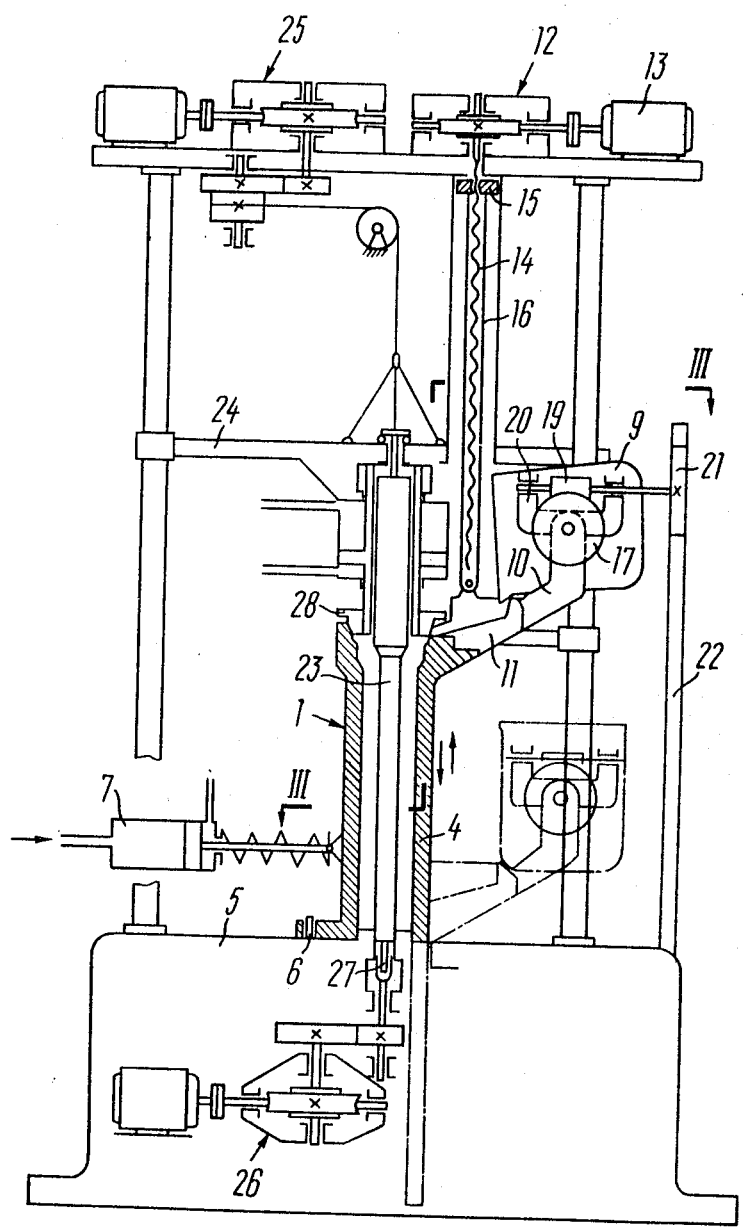
FIG. 1 is a side elevation view, partly in section, of the device for manufacturing pipes from glass metal, in accordance with the invention (the dotted line shows the position of the ladle feeder and the split portion of the mould which is movable in a vertical direction, prior to pouring glass metal into the mould)

With the mould 1 filled up, the mechanisms 12 and 26 are switched off, and the pipe is slightly pressed by a punch 28 (FIG. 1).

Thereupon, the core 23 is removed from the pipe, the portions 2 and 3 are opened by means of the pneumatic cylinder 7, and the pipe is extracted from the mould by means of a removing mechanism (not shown in the drawing).

After this, by means of the same mechanism 12 the ladle feeder 9 is brought to its extreme lower position, and simultaneously assumes its initial upright position.

Then, the cycle of the device operation is repeated in the aforedescribed manner.

The present invention may have the following specific embodiments:

1. A device according to the subject of the invention, wherein a tipping ladle feeder used for pouring glass metal into a mould is mounted in such a manner that it is capable of vertical reciprocation relative to said mould and is rigidly connected to one of the portions of the mould, which is also capable of moving in a vertical direction and is disposed below the other portions of the mould.

2. A device according to the subject of the invention, employing a worm couple whose wheel is rigidly secured on the axle of the ladle feeder tipping the shaft of the worm, and the worm has a gear seated thereon, engaging a fixed vertical rack and rolling thereover during the vertical displacement of the ladle feeder.

We claim:

1. A device for manufacturing pipes from presoftened metal, said device comprising a mould, said mold comprising a plurality of longitudinal sections inclusive of two sections laterally displaceable relative to one another and a third section longitudinally slidable on and along said two sections, means for longitudinally sliding said third section on and along the other two sections, means for laterally displacing said two sections into and out of engagement with the third section, said sections when engaged with one another defining a lateral enclosure, a tipping ladle feeder fixedly connected to said third section for longitudinal displacement therewith relative to the other two sections, said ladle feeder being constructed for feeding presoftened metal into the enclosure defined by said engaged sections while being displaced together with said third section, and means for tilting said ladle feeder in synchronism with the longitudinal displacement thereof with said third section of the mould.

2. A device as claimed in claim 1 wherein said longitudinal sections are vertical, said first two sections being pivotally connected to provide said relative lateral displacement thereof, the third section being vertically displaceable relative to said two sections.

3. A device as claimed in claim 2, wherein said first two sections laterally embrace said third section, said sections having interfitting longitudinal slots into and along which said third section is vertically displaceable.

4. A device as claimed in claim 1, including a core and means supporting said core for axial displacement into and out of the enclosure of said sections, and means for rotating said core within said enclosure.

5. A device as claimed in claim 2, wherein said means for tilting said ladle feeder comprises an axle fixed to the ladle feeder, a worm wheel secured to said axle, a worm in mesh with said worm wheel, a gear rigidly coupled with said worm, and a fixed vertical rack, said gear being in mesh with said rack to tilt said ladle feeder as the latter is vertically displaced.

* * * * *